United States Patent [19]

MacLennan

[11] Patent Number: 5,205,199
[45] Date of Patent: Apr. 27, 1993

[54] SAW TOOTH FOR CIRCULAR SAW

[75] Inventor: Charles D. MacLennan, Hudson Heights, Canada

[73] Assignee: Quadco Equipment Inc., St-Eustache, Canada

[21] Appl. No.: 958,790

[22] Filed: Oct. 9, 1992

[51] Int. Cl.⁵ ............................................. B27B 33/08
[52] U.S. Cl. ....................................................... 83/839
[58] Field of Search ................. 83/835, 837, 839, 840, 83/838, 841, 842, 843, 844, 845, 853

[56] References Cited

U.S. PATENT DOCUMENTS

| | | |
|---|---|---|
| 2,160,525 | 5/1939 | Thornton . |
| 2,736,352 | 2/1956 | Wright . |
| 3,261,384 | 7/1966 | Henderson . |
| 3,358,720 | 12/1967 | Henderson . |
| 3,818,561 | 6/1974 | Montana et al. . |
| 3,945,289 | 3/1976 | Baez Rios . |
| 3,977,447 | 8/1976 | Pease . |
| 3,986,421 | 10/1976 | Schultz . |
| 4,084,470 | 4/1978 | Reed . |
| 4,563,929 | 1/1986 | Ringlee et al. ........................ 83/840 |
| 4,738,291 | 4/1988 | Isley ...................................... 83/853 |
| 4,744,278 | 5/1988 | Wright .................................. 83/839 |
| 4,750,396 | 6/1988 | Gaddis et al. . |
| 4,765,217 | 8/1988 | Ludwig ................................ 83/853 |
| 4,848,205 | 7/1989 | Suzuki et al. ........................ 83/839 |
| 4,879,936 | 11/1989 | Anderson . |
| 4,932,447 | 6/1990 | Morin ................................... 83/839 |
| 5,058,477 | 10/1991 | MacLennan ........................ 83/839 |
| 5,085,112 | 2/1992 | MacLennan . |

Primary Examiner—Frank T. Yost
Assistant Examiner—Scott A. Smith
Attorney, Agent, or Firm—Diller, Ramik & Wight

[57] ABSTRACT

A saw tooth of the type having a plurality of cutting edges at one end, the saw tooth rotatable in its mounting on a saw disk to present a fresh cutting edge when needed. Each cutting edge is angled rather than curved. The tooth can have hardened inserts to provide the angled cutting edges.

8 Claims, 2 Drawing Sheets

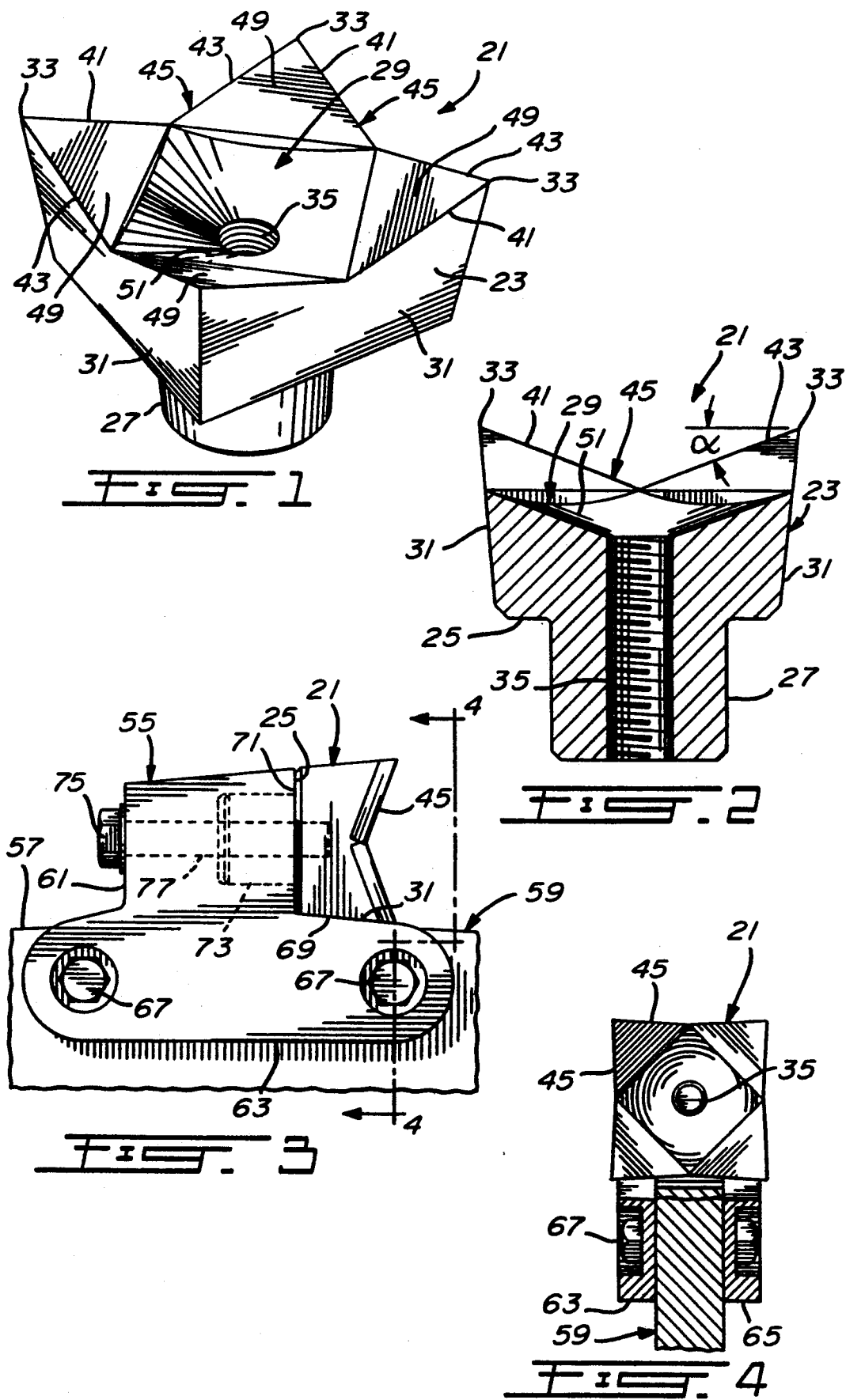

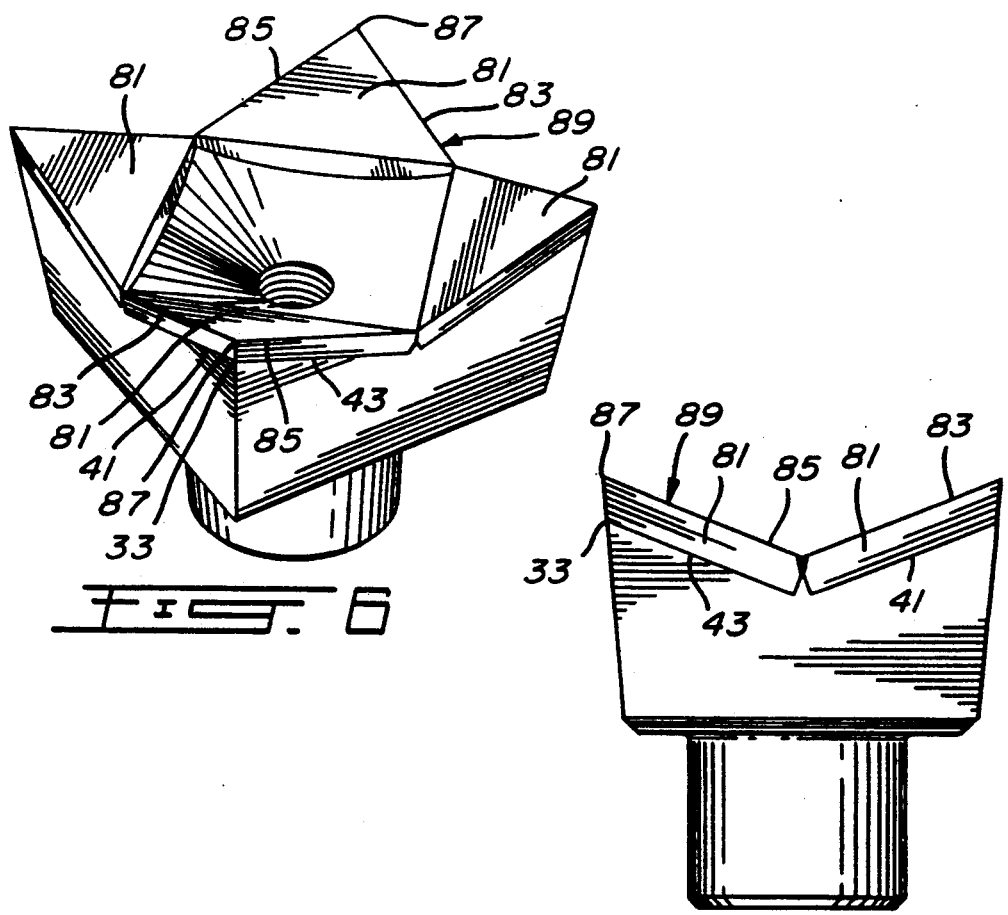
FIG. 6
FIG. 7
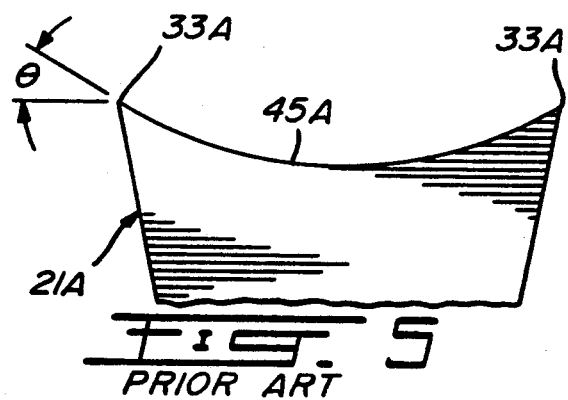
FIG. 5
PRIOR ART
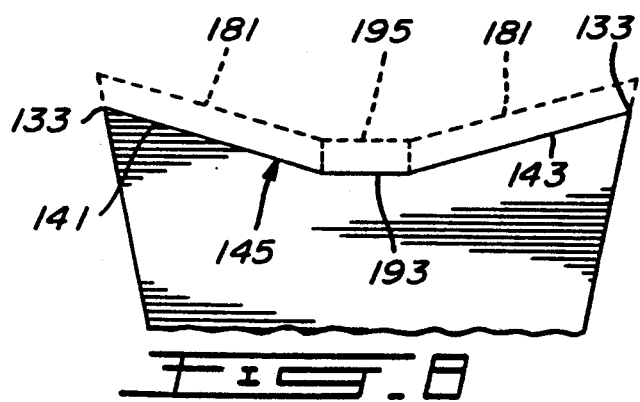
FIG. 8

SAW TOOTH FOR CIRCULAR SAW

BACKGROUND OF THE INVENTION

1. Field of the Invention

This invention is directed toward an improved detachable saw tooth adapted to be mounted on a circular saw disk.

The invention is more particularly directed toward an improved detachable saw tooth of the type that has a plurality of cutting edges. A tooth having a plurality of cutting edges can be repositioned in its mounting on the saw disk to present a sharp cutting edge when the edge currently in use becomes dull.

2. Description of the Prior Art

The saw tooth having a plurality of cutting edges usually has a four-sided main body with a mounting end and a cutting end. The cutting end usually has a concave, part-spherical surface which intersects with the straight sides of the body to form four concavely curved cutting edges. A tooth of this type is shown in U.S. Pat. No. 4,937,447, Morin, issued Jun. 12, 1990. The tooth is mounted, on one side of the body, on a holder that in turn is mounted on the rim of a circular saw disk. All the cutting edges face in the direction of rotation of the tooth but only the outermost cutting edge cuts as the disk rotates. When this cutting edge dulls the tooth can be rotated 90° or 180° in the holder to present a fresh cutting edge. With the tooth having four cutting edges, it has quite a long life before it has to be removed for sharpening or replacement.

However the tooth presents some problems. The curved cutting edges, which meet at relatively sharp corners, tend to have a ripping action when cutting, making it relatively inefficient. In addition, it is quite time consuming to have to rotate all the teeth on the saw disk when the cutting edges become dull. The time between tooth rotations could obviously be increased by making the teeth of harder material or by using hardened inserts to provide the cutting edges. However since the cutting edges are curved, the cost of machining or otherwise forming these hardened teeth or inserts greatly increases making the longer-life teeth very expensive and thus not really any cheaper in the long run.

SUMMARY OF THE INVENTION

It is the purpose of the present invention to provide a detachable saw tooth with multiple cutting edges that has a more efficient cutting action than teeth with curved multiple cutting edges.

It is another purpose of the present invention to provide a detachable saw tooth with multiple cutting edges that has a much longer life than teeth with curved multiple cutting edges, without being cost inefficient.

In accordance with the present invention a saw tooth is provided having angled cutting edges instead of curved cutting edges. The angled cutting edges very roughly approximate the shape of the curved cutting edges. Each angled cutting edge is made up of two straight edges extending between two adjacent corners. The straight edges are of equal length and diverge upwardly and away from each other at a shallow angle to the two corners to form an inwardly angled cutting edge between the corners. In using straight edges, the corners are not as sharply formed as when using curved edges thus lessening wear on the tooth. Also because the corners are not as sharply formed, the cutting edges employ a slicing action rather than a ripping action during cutting which action is more efficient.

The angled cutting edges are formed by machining flat surfaces in the cutting end of the tooth at the corners which surfaces slope inwardly. By the term "inwardly" in referring to the angled cutting edge or the flat surfaces it is meant that the edges or surfaces slope toward the mounting end of the tooth rather than away from it. The flat surfaces are triangular in shape and each abuts the two adjacent surfaces. The angled flat surfaces are particularly useful in permitting the mounting of hardened inserts on the tooth. The inserts, made of carbide or similar material, are of uniform thickness and have a pair of straight edges that diverge from a corner at an angle that generally corresponds to the angle between adjacent sides of the tooth body. In a four-sided tooth body this angle would be 90°. The inserts are preferably triangular in shape and sized to generally match the size of the flat surfaces. Each insert is securely fastened to a flat surface by welding or other similar means. The straight edges of each insert are generally aligned with the sides of the body. The two adjacent straight edges of two adjacent inserts form an angled cutting edge. Four such angled cutting edges are formed by the four inserts used in a four-sided tooth body. These cutting edges, made from hardened material, greatly increase the life of the tooth at acceptable cost.

The invention is particularly directed toward a saw tooth having a frusto-pyramidal shaped body with a mounting end and a cutting end, the cutting end being recessed inwardly. The body has a plurality of flat sides extending between the mounting end and the cutting end with each flat side at the cutting end having an inwardly angled cutting edge.

The invention is also particularly directed toward a saw tooth having a frusto-pyramidal shaped body with a mounting end and a cutting end, the cutting end being recessed inwardly. The body has a plurality of flat sides extending between the mounting end and the cutting end. There is a flat surface on the cutting end at each corner formed between two adjacent sides, each surface sloping inwardly. A hardened insert is fastened to each surface providing two straight edges diverging from each corner toward the adjacent corners. The adjacent straight edges from adjacent inserts form angled cutting edges about the periphery of the cutting end.

BRIEF DESCRIPTION OF THE DRAWING

The invention will now be described in detail having reference to the accompanying drawings in which:

FIG. 1 is a perspective view of the tooth;

FIG. 2 is a cross-section view of the tooth;

FIG. 3 is a partial elevation view of the tooth when mounted;

FIG. 4 is a cross-section view along line 4—4 of FIG. 3;

FIG. 5 is a detail view of a prior art tooth;

FIG. 6 is a perspective view of another embodiment of the tooth;

FIG. 7 is an elevation view of the tooth shown in FIG. 6; and

FIG. 8 is a partial elevation view of another embodiment of the tooth.

DESCRIPTION OF THE PREFERRED EMBODIMENTS

The saw tooth 21 of the present invention as shown in FIGS. 1 and 2 has a tooth body 23 with a square frusto-pyramidal shape. The small or mounting end 25 of the tooth body 23 has a centrally located, cylindrical shank 27 extending therefrom. The large or cutting end 29 of the tooth body 23 is recessed. Divergent, flat, side surfaces 31 extend between the mounting and cutting ends 25, 29 forming sharp corners 33 at the cutting end 29. A central threaded bore 35 extends through the tooth body 23 from the free end of shank 27 to the cutting end 29.

The saw tooth 21 has a pair of straight edges 41, 43 diverging from each corner 33 at the cutting end 29. The edges 41, 43 each angle down toward the mounting end 25 of the body 23 from the corner 33 at a relatively shallow angle α. Angle α is 127° but can vary. Each straight edge 41, 43 extends halfway from corner 33 to an adjacent corner and joins with the straight edges extending from these adjacent corners to form angled cutting edges 45. Each angled cutting edge 45 forms the end of a side surface 31 at the cutting end 29 and together they define the outer perimeter of the cutting end 29.

The straight edges 41, 43 at each corner 33 can be formed by machining flat surfaces 49 at each corner. Each flat surface 49 can be triangular in shape, sloping inwardly from the corner toward the mounting end 25. The flat surfaces 49 meet at the sides 31 midway between the corners 33. The sides of the surface 49 diverging from the corner 33 form the straight edges 41, 43. The surface 51 of the cutting end 29 inside the triangular flat surfaces 49 can be a concave, part-spherical surface.

The saw tooth 21 is adapted to be mounted in a cutting holder 55 which in turn is mounted on the peripheral edge 57 of a circular saw disk 59 as shown in FIGS. 3 and 4. The holder 55 has a body 61 from which legs 63, 65 depend and straddle the disk 59. Bolts 67, passing through holes in the legs 63, 65 and disk 59 fasten the holder 55 to the disk 59. The front of the body 61 of the holder 55 has a flat surface 69 for receiving one flat side 31 of the saw tooth body 23 and a shoulder 71 against which the mounting end 25 of the tooth body 23 abuts. A recess 73 in the holder body 61 receives the tooth shank 27. A bolt 75 passes through a bore 77 in the holder body 61 and bore 35 in the tooth body 23 to securely mount it on the holder 55. A plurality of saw teeth are mounted about the periphery of the saw disk 59 in identical holders 55.

The outermost angled, cutting edge 45 of the mounted tooth 21, parallel to the rotational axis of the disk 59, cuts as the disk rotates. When the outermost cutting edge becomes dull, the bolt 75 is removed, the tooth 21 is rotated 90° or 180°, to present a sharp cutting edge and the tooth is refastened to the holder with the bolt.

The angled cutting edge 45 does not have corners 33 that are as sharp as the corners 33A on the prior art tooth 21A shown in FIG. 5. The curved cutting edge 45A of the prior art tooth 21A results in a very sharp and pointed corner 33A because the angle θ of the curved edge 45A right adjacent the corner is quite large. Because of the sharp corners on the prior art tooth, its cutting action is to rip out the material. Applicant's tooth, because of the shallower corners has a slicing cutting action which is more efficient.

Saw tooth 21 readily lends itself to the use of hardened inserts to provide cutting edges that stay sharp longer thereby increasing the life of the tooth. The inserts 81, as shown in FIGS. 6 and 7, are made of hard material, such as carbide, are triangular in shape and have a uniform thickness. Each insert has two straight edges 83, 85 diverging from a corner 87. Each insert 81 is sized to substantially fit on the flat surface 49 at the corner 33 of each tooth 21 with its corner 87 aligned with tooth corner 33 and with its straight edges 83, 85 aligned with the straight edges 41, 43. Each insert 81 is fastened to the tooth 21 on the flat, mounting surface 49 by welding or other suitable means.

The straight edges 83, 85 of each insert 81 abut, or nearly abut, the straight edges from adjacent inserts to form hardened, angled, cutting edges 89 about the periphery of the cutting end of the tooth. Each insert 81 is easy to machine or form. Only flat planes and straight edges make up the insert. No hard-to-machine curved surfaces are required.

The tooth 21, with or without the inserts 81, has angled cutting edges 45 or 89 that very roughly approximate the shape of the curved cutting edges 45A on the prior art teeth but without the sharp corners. The tooth 21 could, if desired, be made with a cutting edge that more closely approximates the curved edges. As shown in FIG. 8 the tooth could have an angled cutting edge 145 formed from two straight edges 141, 143 that extend down toward each other from the corners 133 but which are joined by a central straight horizontal edge 193. If this tooth is used with inserts 181 an extra insert 195 is required for the central edge 193.

The tooth 21 described is a four-sided tooth but the invention could be applied to teeth having six or eight sides as well.

I claim:

1. A saw tooth having a frusto-pyramidal shaped body with a mounting end and a cutting end, the cutting end being recessed inwardly, the body having a plurality of flat sides extending between the mounting end and the cutting end, the flat sides forming corners at the cutting end where they meet, a pair of straight edges diverging from each corner at a shallow angle toward the mounting end, each straight edge from each corner joining with a straight edge from an adjacent corner to form an angled cutting edge, each angled cutting edge defining the end of a flat side.

2. A saw tooth as claimed in claim 1, wherein a flat surface is formed at each corner sloping inwardly toward the mounting end, the sides of the surface diverging from the corner forming the pair of straight edges.

3. A saw tooth as claimed in claim 2, wherein the flat surfaces meet at the flat sides midway between the corners.

4. A saw tooth as claimed in claim 3, wherein the flat surfaces are triangular in shape.

5. A saw tooth having a frusto-pyramidal shaped body with a mounting end and a cutting end, the cutting end being recessed inwardly, the body having a plurality of flat sides extending between the mounting end and the cutting end, a flat surface on the cutting end at each corner formed between two adjacent sides, each surface sloping inwardly, a hardened insert fastenened to each surface providing two straight edges diverging from each corner toward adjacent corners, the edges from adjacent inserts forming angled cutting edges about the periphery of the cutting end.

6. A saw tooth as claimed in claim 5, wherein the inserts have a uniform thickness and have only flat planes and straight edges.

7. A saw tooth as claimed in claim 5, wherein the inserts have a uniform thickness and are triangular in shape.

8. A saw tooth as claimed in claim 7, wherein the inserts abut.

* * * * *